US012656148B2

(12) United States Patent (10) Patent No.: US 12,656,148 B2

Reuther et al. (45) Date of Patent: Jun. 16, 2026

(54) IDENTIFYING MANIPULATION OF A SENSOR UNIT

(71) Applicant: Vitesco Technologies GmbH, Regensburg (DE)

(72) Inventors: Achim Reuther, Donaustauf (DE); Ludwig Schifferl, Pentling (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 352 days.

(21) Appl. No.: 18/262,706

(22) PCT Filed: Feb. 2, 2022

(86) PCT No.: PCT/EP2022/052481

§ 371 (c)(1),
(2) Date: Jul. 24, 2023

(87) PCT Pub. No.: WO2022/171502

PCT Pub. Date: Aug. 18, 2022

(65) Prior Publication Data

US 2024/0393135 A1 Nov. 28, 2024

(30) Foreign Application Priority Data

Feb. 12, 2021 (DE) ..................... 10 2021 201 324.4

(51) Int. Cl.
G01D 3/08 (2006.01)
G01D 18/00 (2006.01)
(Continued)

(52) U.S. Cl.
CPC ............ G01D 3/08 (2013.01); G01M 15/102 (2013.01)

(58) Field of Classification Search
CPC ............ G01D 3/08; G01D 3/022; G01D 4/00; G01D 4/008; G01D 21/00; G01D 18/00;
(Continued)

(56) References Cited

U.S. PATENT DOCUMENTS

| | | | | |
|---|---|---|---|---|
| 6,518,880 B2 * | 2/2003 | Tanizawa | ................. | G01D 3/08 |
| | | | | 340/657 |
| 8,650,942 B2 * | 2/2014 | Klenk | ................. | F02D 41/1438 |
| | | | | 73/114.69 |

(Continued)

FOREIGN PATENT DOCUMENTS

| | | | | | |
|---|---|---|---|---|---|
| CN | 105122945 B | * | 8/2017 | ............. | H05B 47/11 |
| CN | 108363380 A | * | 8/2018 | ............... | G05D 1/00 |

(Continued)

OTHER PUBLICATIONS

Search Report for International Application No. PCT/EP2022/052481, 12 pages, May 9, 2022.

(Continued)

*Primary Examiner* — Jeffrey P Aiello

(74) *Attorney, Agent, or Firm* — Slayden Grubert Beard PLLC

(57) ABSTRACT

Various teachings of the present disclosure include a method for identifying manipulation of a sensor unit including a measuring unit to measure a physical property and a control unit to receive measurement signals from the measuring unit and to send control signals to the measuring unit. The method may include: sending a diagnostic signal to the measuring unit from the control unit; and receiving at the control unit a response signal generated by the measuring unit in response to the diagnostic signal; or identifying manipulation of the sensor unit if a response signal is not received.

9 Claims, 1 Drawing Sheet

(51) Int. Cl.

| | | |
|---|---|---|
| *G01D 21/00* | (2006.01) | |
| *G01M 15/10* | (2006.01) | |
| *G01R 11/24* | (2006.01) | |

(58) Field of Classification Search

CPC ... G01D 1/00; G01D 2204/24; G01M 15/102;
G01R 31/2829; G01R 31/002; G01R
31/001; G01R 31/00; G01R 31/2879;
G01R 35/00; G06F 3/0346; G06F 3/046

USPC .... 324/500; 702/183, 189, 85, 150, 32, 108,
702/127, 62, 185

See application file for complete search history.

(56) References Cited

U.S. PATENT DOCUMENTS

| | | | |
|---|---|---|---|
| 9,892,293 B1 * | 2/2018 | Wade ....................... G06F 21/86 |
| 2008/0048825 A1 * | 2/2008 | Naether ................... G07C 7/00 |
| | | | 340/5.3 |
| 2008/0197856 A1 | 8/2008 | Schnaibel et al. ............ 324/549 |
| 2013/0241540 A1 * | 9/2013 | Ausserlechner ....... G01D 3/036 |
| | | | 324/226 |
| 2014/0028463 A1 * | 1/2014 | Chamarti ............... G01D 4/002 |
| | | | 340/870.02 |
| 2022/0052481 A1 * | 2/2022 | Pon .................... H01R 13/6205 |

FOREIGN PATENT DOCUMENTS

| | | | | |
|---|---|---|---|---|
| CN | 111044684 A | 4/2020 | ............. | G01N 33/00 |
| DE | 10131229 A1 | 4/2002 | .............. | G01D 3/08 |
| DE | 102004043052 B3 * | 1/2006 | .............. | G07C 7/00 |
| DE | 102004031625 A1 | 2/2006 | .......... | G01N 27/407 |
| DE | 102011002502 A1 | 2/2012 | .............. | F01N 11/00 |
| DE | 10 2014 104605 | 10/2015 | .............. | H04L 9/32 |
| DE | 102014104605 A1 * | 10/2015 | .......... | H04L 9/3236 |
| EP | 3581894 A1 | 12/2019 | ........... | G01D 21/00 |
| JP | 2011024354 A | 2/2011 | .............. | H02P 9/04 |
| WO | 2006 027297 | 3/2006 | .............. | G07C 5/08 |

OTHER PUBLICATIONS

Kamatagi et al., "Development of Energy Meter Monitoring System (EMMS) for Data Acquisition and Tampering Detection using IoT" 2020 IEEE International Conference, 3 pages, Jul. 2, 2020.

* cited by examiner

IDENTIFYING MANIPULATION OF A SENSOR UNIT

CROSS-REFERENCE TO RELATED APPLICATIONS

This application is a U.S. National Stage Application of International Application No. PCT/EP2022/052481 filed Feb. 2, 2022, which designates the United States of America, and claims priority to DE Application No. 10 2021 201 324.4 filed Feb. 12, 2021, the contents of which are hereby incorporated by reference in their entirety.

TECHNICAL FIELD

The present disclosure relates to sensors. Various embodiments include methods and/or systems for identifying manipulation of a sensor unit, e.g., a sensor unit for an internal combustion engine of a vehicle.

BACKGROUND

Sensor units usually consist of a measuring unit designed to measure a physical property and to generate an electrical measuring signal indicating the physical property, such as a current signal, voltage signal or resistance signal, and a control unit connected to the measuring unit, which is designed to receive and process the measurement signals generated by the measuring unit and to send control signals to the measuring unit. The sensor unit, in turn, can be connected to a control device which further processes the sensor signals prepared by the sensor unit.

More often, however, sensor manipulations occur in which, for example, the original measuring unit is replaced by a different measuring unit which may not always have the measurement accuracy of the original measuring unit. The original measuring unit is also frequently replaced by an electrical component, which, however, only provides satisfactory measurement signals but does not indicate the physical property to be measured. Such manipulations must be identified, as they also manipulate and falsify the measuring signal.

Document EP 3 581 894 A1 discloses a method, a device, and a system for detecting an attempted manipulation of a sensor of a vehicle. In this solution, a first measurement signal is read in, which is representative of a measured value of the first measured variable detected with the sensor. It is also determined whether the first measuring signal is outside a specified useful range. If it is determined that the first measuring signal is outside a specified useful range, an output signal is issued, which is representative of a manipulation attempt.

Document JP 2011-024354 A describes a control procedure for a motor generator. In particular, it is designed to detect whether a rotation speed sensor is connected to the ECU or not. This identifies an interruption in the connection when a detection signal can no longer be received from the speed sensor. In addition, it is disclosed that a connection interruption is detected when the ECU receives a pulse signal from the rotation speed sensor that is not a continuous signal at predetermined intervals.

Document US 2014 0028463 A1 discloses a system and a method for identifying the replacement of a sensor. In this case the absence or interruption of a connection of a current sensor from a controller can be determined by means of the raw data of the applied input voltage, which due to the error may be random or irregular.

Document CN 111 044 684 A shows an aging detection system for an NOx sensor. The NOx sensor signal is compared to a reference signal during predetermined operating conditions and, in the event of a deviation, aging of the sensor is inferred.

SUMMARY

Teachings of the present disclosure may be used to detect manipulation, such as a replacement of the original measuring unit, of a sensor unit in a reliable manner and to issue a corresponding warning. As an example, some embodiments include a method for identifying manipulation of a sensor unit (100), which consists of a measuring unit (110), which is designed to measure a physical property, and a control unit (120) connected to the measuring unit (110), which is designed to receive measurement signals from the measuring unit (110) and to send control signals to the measuring unit (110), wherein the method comprises: sending at least one diagnostic signal to the measuring unit (110) by means of the control unit (120), receiving at the control unit (120) a response signal generated by the measuring unit (110) in response to the diagnostic signal, and identifying manipulation of the sensor unit (100) if a response signal is not received.

In some embodiments, the sending of at least one diagnostic signal to the measuring unit (110) by means of the control unit (120) comprises: sending a plurality of diagnostic signals to the measuring unit (110) by means of the control unit (120) at predetermined periodic time intervals, wherein the predetermined periodic time intervals are shorter than a predetermined mounting time interval during which a replacement of the measuring unit (110) of the sensor unit (100) can be carried out.

In some embodiments, the diagnostic signal is a current pulse, a voltage, or an alternating voltage signal with a defined frequency.

In some embodiments, the response signal is a voltage response, a current response, or an alternating voltage signal with defined amplitudes and phase shift.

In some embodiments, the sensor unit (100) is designed to be deployed in an aircraft, a land vehicle, a rail vehicle, a watercraft, or a building.

In some embodiments, the sensor unit (100) is designed to be deployed in an electric vehicle, a hybrid vehicle, or a vehicle with an internal combustion engine.

In some embodiments, the sensor unit (100) is an exhaust gas sensor for detecting the nitrogen oxide and/or ammonia concentration in the exhaust gas tract of the internal combustion engine of the vehicle, wherein the measuring unit has a ceramic-based sensor element.

In some embodiments, the vehicle has a vehicle control unit for controlling the internal combustion engine, which is connected to the sensor unit (100), in particular the control unit (120) of the sensor unit (100), the method further comprising: defining a sensor time value for the sensor unit (100), comparing the sensor time value with an internal combustion engine time value of the vehicle, and identifying manipulation of the sensor unit (100) if the sensor time value deviates from the internal combustion engine time value by more than a time threshold value.

In some embodiments, the method is also carried out outside of the operating period of the sensor unit (100).

In some embodiments, the method further comprises issuing a warning indicating manipulation of the sensor unit (100) when manipulation of the sensor unit (100) has been detected.

BRIEF DESCRIPTION OF THE DRAWINGS

Further objects and features of the teachings of the present disclosure will become apparent to a person skilled in the art by putting the present teaching into practice and taking into consideration the accompanying drawings, in which.

DETAILED DESCRIPTION

Figure 1:
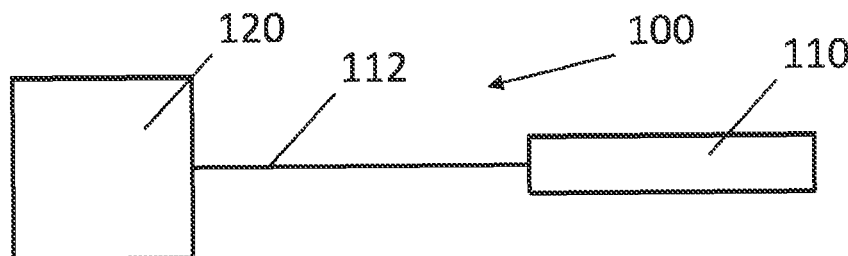
FIG. 1 shows a diagrammatic view of a sensor unit incorporating teachings of the present disclosure.

Some embodiments of the teachings herein include examining a sensor unit to check whether the control unit of the sensor unit is connected to a properly functioning and correct measuring unit and that no unauthorized replacement of the measuring unit with another measuring unit, such as an emulator, has taken place. The embodiments may include checking for such manipulation by means of a predetermined diagnostic signal which the control unit sends to the measuring unit, and to analyze whether any corresponding response signal is received in response to the diagnostic signal sent. This ensures that manipulation in the form of an unauthorized replacement of the measuring unit has not taken place and that the properly functioning measuring unit is therefore still connected to the control unit.

In some embodiments, the diagnostic signal can be sent at short time intervals, this time interval being selected in such a way that a replacement of the measuring unit within two temporally consecutive diagnostic signals is not possible. If no response signal is received in response to the diagnostic signal sent, then manipulation of the sensor unit, in particular the measuring unit, can be identified.

In some embodiments, there is a method for identifying manipulation of a sensor unit including a measuring unit which is designed to measure a physical property, and a control unit connected to the measuring unit, designed to receive measurement signals from the measuring unit and to send control signals to the measuring unit. An example method includes sending at least one diagnostic signal to the measuring unit by means of the control unit, receiving at the control unit a response signal generated by the measuring unit in response to the diagnostic signal, and identifying manipulation of the sensor unit if a response signal is not received. If no response signal is received, it can be concluded that the properly function measuring unit is no longer present and thus a manipulation of the sensor unit has taken place.

In some embodiments, sending at least one diagnostic signal to the measuring unit using the control unit comprises sending a plurality of diagnostic signals to the measuring unit by means of the control unit at predetermined periodic time intervals. The predetermined periodic time intervals are shorter than a predetermined mounting time interval, during which a replacement of the measuring unit of the sensor unit can be carried out in the shortest possible time.

The diagnostic signals are transmitted by means of the control unit at predetermined periodic time intervals, during which manipulation or replacement of the measuring unit is impossible, and thus a manipulation of the sensor unit can again be concluded if no response signal is received. In particular, in the event of an unauthorized replacement of the measuring unit, the response signal is temporarily absent during the removal of the correct unit and mounting of the other measuring unit, which can indicate the manipulation of the sensor unit.

The diagnostic signals sent from the control unit to the measuring unit may comprise a current pulse, a voltage, or an alternating voltage signal with a defined frequency.

In some embodiments, the response signal generated by the measuring unit in response to the transmitted diagnostic signal is, based on the above-mentioned examples of the diagnostic signal, a voltage response, a current response or an alternating voltage signal with defined amplitude, bandwidth, frequency and/or phase shift.

In some embodiments, the sensor unit is designed to be deployed in an aircraft, a land vehicle, a rail vehicle, a watercraft, or a building. Consequently, the method may be used with any sensor units consisting of a control unit and a measuring unit and by means of which manipulation of the sensor unit can be reliably detected.

In some embodiments, the sensor unit is a sensor unit which can be deployed in an electric vehicle, a hybrid vehicle, or a vehicle with internal combustion engine. In some embodiments, the sensor unit is an exhaust gas sensor for detecting the nitrogen oxide and/or ammonia concentration in the exhaust tract of the internal combustion engine of the vehicle, wherein the measuring unit has a ceramic-based sensor element, such as an yttrium-stabilized zirconium oxide.

In some embodiments, the yttrium-stabilized zirconium oxide together with the electronics mounted thereon forms the measuring unit of the sensor unit in the sense of the present invention. The sensor control unit (SCU), which is electrically connected to the measuring unit, forms the control unit of the sensor unit.

In some embodiments, the vehicle has a vehicle control unit for controlling the internal combustion engine, which is connected to the sensor unit, in particular the control unit of the sensor unit. In some embodiments, the method further comprises defining a sensor time value for the sensor unit, comparing the sensor time value to an internal combustion engine time value of the vehicle, and identifying manipulation of the sensor unit if the sensor time value deviates from the internal combustion engine time value by more than a time threshold value.

If the sensor unit were to be electrically isolated from the vehicle control unit and then a manipulation were to take place, both the sending of the diagnostic signal and the receiving of a response signal generated in response to it would fail to occur, which means that the manipulation of the sensor unit can no longer be reliably detected. However, disconnecting the sensor unit would cause the sensor time values or sensor timestamp to be no longer synchronous with the internal combustion engine time value or engine timestamp, allowing a potential fault or manipulation of the sensor unit to be detected. Consequently, when starting up or initially setting up the sensor unit, the time values of the sensor unit and the internal combustion engine are matched in order to reliably detect such disconnection or manipulation.

In some embodiments, the method is carried out outside the normal operating period of the sensor unit. This means that the method can also be carried out, for example, when the vehicle is stationary and switched off, but the sensor unit is still supplied with energy and thus the method can be carried out.

In some embodiments, the method further comprises issuing a warning indicating manipulation of the sensor unit if manipulation of the sensor unit has been detected. In particular, the user of the sensor unit should be informed that a manipulation of the sensor unit has taken place. It is also conceivable to issue the warning to an official service person who, when examining the sensor unit, ascertains that the sensor unit has been tampered with intentionally, but without authorization, which may not be legally compliant.

FIG. 1 shows a schematic view of a sensor unit 100 incorporating teachings of the present disclosure. The sensor unit 100 of FIG. 1 consists of a measuring unit 110, which is connected to a control unit 120 by means of an electrical connecting cable 112. By means of the electrical connecting cable 112, the control unit 110 can send control signals to the measuring unit 110 and the measuring unit 110 can in turn transmit measurement signals via the electrical connecting cable 112 to the control unit 110 for further processing.

Figure 2:
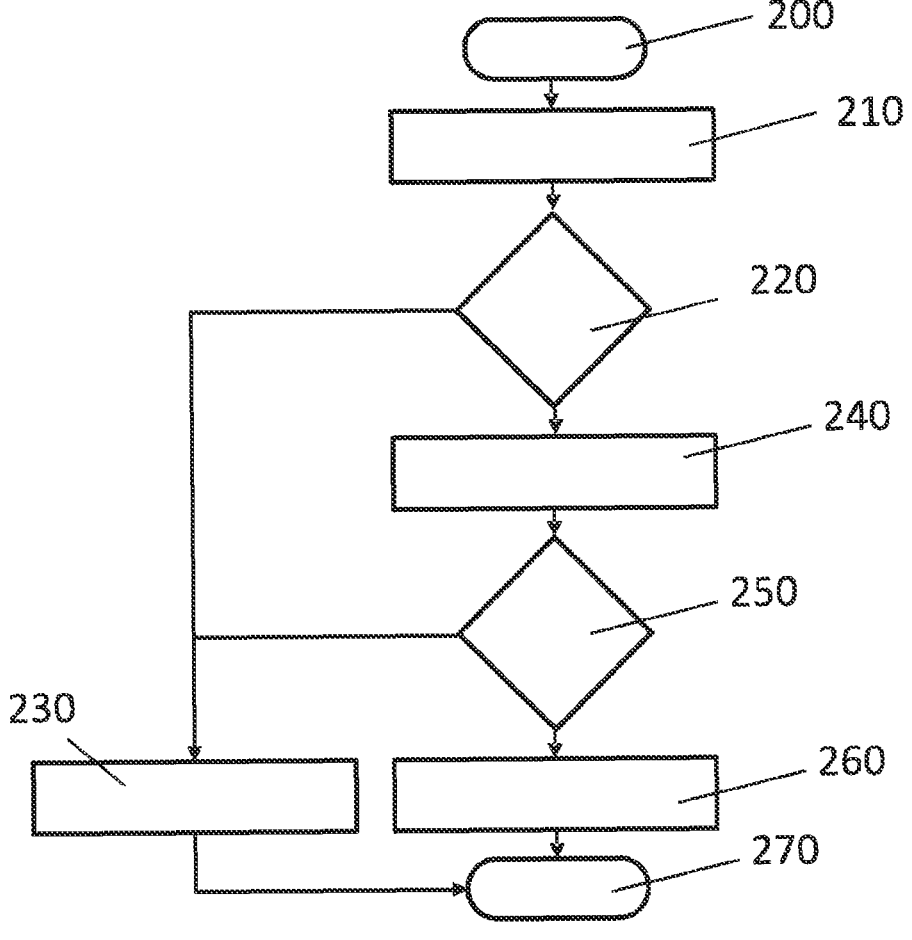
FIG. 2 shows a flow diagram of an example method incorporating teachings of the present disclosure for identifying manipulation of the sensor unit of FIG. 1.

FIG. 2 shows a flow diagram of an example method incorporating teachings of the present disclosure for identifying manipulation of the sensor unit 100 of FIG. 1. In particular, the example method can be used to detect a replacement of the measuring unit 110 of the sensor unit 100 of FIG. 1 by another measuring unit.

The method of FIG. 2 starts at step 200 and then proceeds to step 210, in which the control unit 120 sends at least one diagnostic signal to the measuring unit 110 via the electrical connecting cable 112. In the subsequent step 220, it is checked whether the control unit 120 receives a response signal generated by the measuring unit 110 in response to the diagnostic signal.

If it is determined in step 220 that no response signal is received, the method proceeds to step 230, at which manipulation of the sensor unit 100 is identified, before the method ends at step 270.

However, if it is determined in step 220 that the control unit 120 has received a response signal from the measuring unit 110 in response to the diagnostic signal sent, the method proceeds to step 240, at which the last stored sensor time value is read. In a subsequent step 250, it is checked whether the read sensor time value is synchronous with an external time value, such as an internal combustion engine time value. If it is determined in step 250 that the sensor time value deviates from the internal combustion engine time value by more than a time threshold value, the method returns to step 230, at which manipulation of the sensor unit is detected, before the method ends again at step 270. For example, the time threshold can be 10 seconds, 5 seconds, or approximately 1 second. In some embodiments, the time threshold value can be selected depending on the complexity of the electrical supply line, wherein the time threshold value can preferably be in the one- or two-digit second range.

However, if it is determined in step 250 that the sensor time value is synchronous with the internal combustion engine time value, i.e. that the sensor time value deviates from the internal combustion engine time value by no more than a predetermined time threshold value, the method proceeds to step 260, at which a non-manipulated sensor unit 100 is identified, before the method then ends again at step 270.

The comparison of the sensor time value with the external time value, such as the internal combustion engine time value, provides information about whether or not the sensor unit 100 has been electrically disconnected from the associated system in the meantime. If this is the case, such an electrical disconnection can be detected by means of the stored time values and comparing them with each other, which can be an indication of manipulation of the sensor unit 100, in particular an unauthorized replacement of the measuring unit 110.

What is claimed is:

1. A method for a sensor unit to self-test for tampering, the sensor unit including a measuring unit to measure a physical property and a control unit to receive measurement signals from the measuring unit and to send control signals to the measuring unit, the method comprising:
    sending a predetermined diagnostic signal to the measuring unit from the control unit;
    wherein the measuring unit is programmed to generate a response signal upon receiving the predetermined diagnostic signal; and
    wherein the measuring unit is programmed to send the response signal to the control unit in response to the diagnostic signal; and
    issuing a warning indicating manipulation of the sensor unit if no response signal is received by the control unit or if the control unit determines the response signal fails a predetermined criterion.

2. The method as claimed in claim 1, wherein sending the diagnostic signal comprises sending a plurality of diagnostic signals at predetermined periodic time intervals;
    wherein the predetermined periodic time intervals are shorter than a predetermined mounting time interval during which a replacement of the measuring unit of the sensor unit can be carried out.

3. The method as claimed in claim 1, wherein the diagnostic signal comprises: a current pulse, a voltage, or an alternating voltage signal with a defined frequency.

4. The method as claimed in claim 1, wherein the response signal comprises: a voltage response, a current response, or an alternating voltage signal with defined amplitudes and phase shift.

5. The method as claimed in claim 1, wherein the sensor unit is deployed in an aircraft, a land vehicle, a rail vehicle, a watercraft, or a building.

6. The method as claimed in claim 1, wherein the sensor unit is deployed in an electric vehicle, a hybrid vehicle, or a vehicle with an internal combustion engine.

7. The method as claimed in claim 6, wherein:
    the sensor unit comprises an exhaust gas sensor for detecting the nitrogen oxide and/or ammonia concentration in the exhaust gas tract of the internal combustion engine of the vehicle; and
    the measuring unit comprises a ceramic-based sensor element.

8. The method as claimed in claim 6, wherein the vehicle has a vehicle control unit for controlling the internal combustion engine, the vehicle control unit connected to the sensor unit, and the method further comprises:
    defining a sensor time value for the sensor unit;
    comparing the sensor time value with an internal combustion engine time value of the vehicle; and
    identifying manipulation of the sensor unit if the sensor time value deviates from the internal combustion engine time value by more than a time threshold value.

9. The method as claimed in claim 1, wherein the method is performed outside of an operating period of the sensor unit.

\* \* \* \* \*